United States Patent
Schaitberger

[11] 3,784,779
[45] Jan. 8, 1974

[54] ARTICLE INCLUDING A WELD JOINT IN CLOSE PROXIMITY TO A FRAGILE OR THERMALLY SENSITIVE ELEMENT AND METHOD OF MAKING THE SAME

[75] Inventor: Daniel A. Schaitberger, Grosse Pointe Park, Mich.

[73] Assignee: Quanta Welding Company, Troy, Mich.

[22] Filed: Jan. 17, 1972

[21] Appl. No.: 218,091

[52] U.S. Cl. .................................. 219/117, 219/91
[51] Int. Cl. .............................................. B23k 9/00
[58] Field of Search .................. 219/117 R, 107, 91, 219/85, 86

[56] References Cited
UNITED STATES PATENTS

| | | | |
|---|---|---|---|
| 2,134,705 | 11/1938 | Crecca | 219/117 R |
| 3,676,637 | 7/1972 | Anderson | 219/91 |
| 2,569,059 | 9/1951 | Huff et al | 219/107 |
| 3,676,636 | 7/1972 | Anderson | 219/107 X |
| 3,666,910 | 5/1972 | Anderson | 219/107 |
| 2,305,042 | 12/1942 | Thacker | 219/91 |

Primary Examiner—R. F. Staubly
Assistant Examiner—L. A. Schutzman
Attorney—Wilson & Fraser

[57] ABSTRACT

An assembly of at least two metal elements and at least a third fragile and/or heat sensitive elements utilizing a solid state resistance weld between the metal elements made in close proximity to the third element in a manner to avoid mechanical and thermal deterioration or stresses. Typicaly a hinge mounting for a glass window is comprised of a piece of tempered glass having a hole containing an elastomeric bushing through which is passed a headed metal rod which is solid state resistance welded to a metal plate abutting the glass and bushing. Such welds are made by a short duration pulse of high current density programmed in time relation with a pressure pulse to effect the bond with very little temperature increase of the mass of the elements and essentially no change in their form.

22 Claims, 10 Drawing Figures

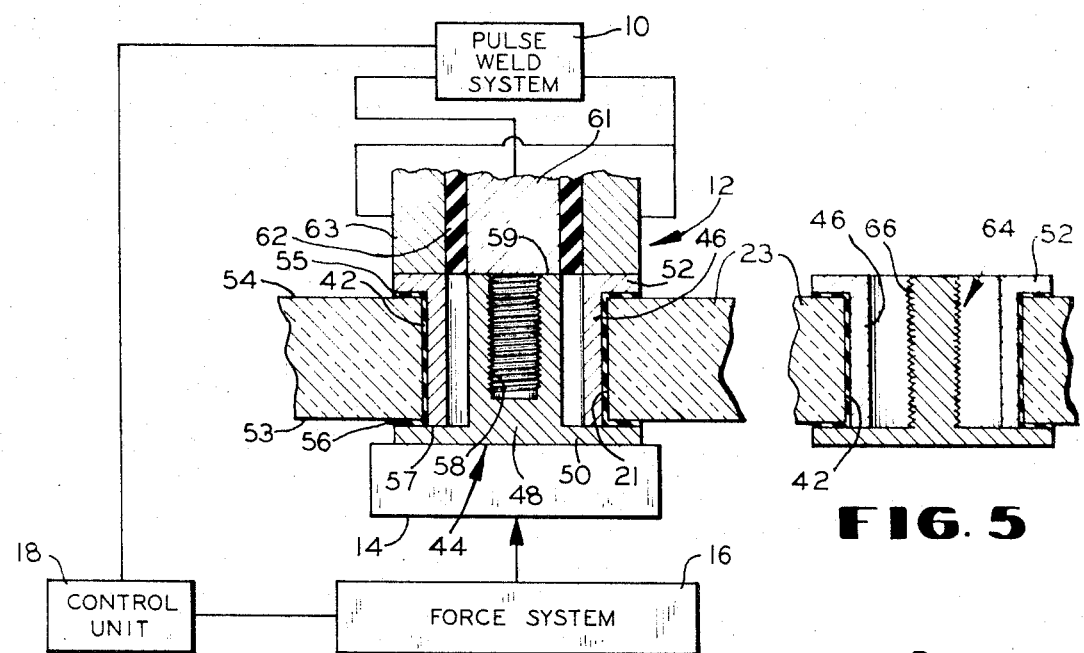
FIG. 4
FIG. 5
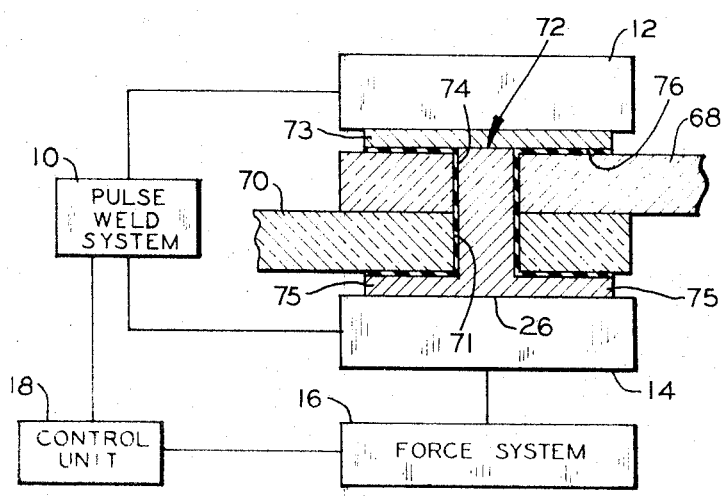
FIG. 6
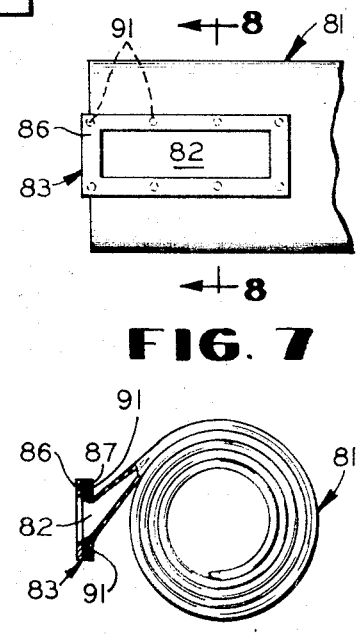
FIG. 7
FIG. 8
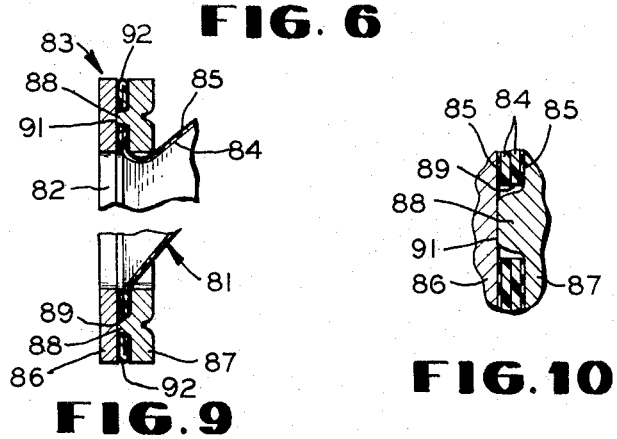
FIG. 9
FIG. 10

ARTICLE INCLUDING A WELD JOINT IN CLOSE PROXIMITY TO A FRAGILE OR THERMALLY SENSITIVE ELEMENT AND METHOD OF MAKING THE SAME

BACKGROUND OF THE INVENTION

There are many applications where it is desirable to attach fixtures to fragile and/or heat sensitive materials. Handles on ceramic pots, and hinge or lock mount brackets on glass windows and doors are examples of fixtures on fragile materials. Tempered glass or laminated safety glass, and elastomer structures such as bushings are examples of heat sensitive materials. To attach a fixture to the above materials, it is preferrable to do so in a manner which will not adversely affect the sensitive characteristics of the material to which the fixture is being attached. It is, therefore, advantageous in attaching the fixture or supporting structure to firmly engage the material without detrimentally stressing it and without overheating the heat sensitive materials.

Structures including heat sensitive or fragile elements in close proximity to joints between metallic elements require special fastening designs and techniques in order to avoid heat damage or mechanical damage to the heat sensitive or fragile elements. Particular difficulty has been encountered where metallic portions extend through or closely adjacent the sensitive or fragile material and must be joined to cooperating metallic portions. Fasteners of the screw types usually are drawn up upon their associated elements to develop some locking force on the threads and thereby impose compressive forces and stresses on those associated elements. Rivet and weld joints of conventional form are at best imprecisely controlled as to the displacement of the bonded elements during their fabrication and when employed in assemblies which embrace associated fragile elements can impose detrimental stresses thereon. Further, the high temperatures ordinarily developed in welds and their surroundings can destroy or damage thermally sensitive materials in their vicinity. Thus, it is frequently difficult or impossible to secure metal pieces together where they are in close proximity to heat sensitive or fragile elements due to the development of excessive heat, excessive compressive stress, or localized distortion due to thermally or mechanically induced stresses.

Frequently, a tight fit is required between metal parts to be joined and intermediate or adjacent heat sensitive or fragile elements. The prior joint structures discussed above do not offer the requisite degree of precision in fit without substantial losses in normal manufacturing processes.

One type of thermally sensitive material frequently secured between metallic elements which are joined with the material present are elastomers which may function as stress relievers, shock absorbers, or fluid seals. Such intermediate elements are subject to deterioration, disfigurement or even destruction when the metallic elements are joined by prior known welding techniques.

The present article and method overcome the above problems with a welded joint structure formed by concentrating a high level of energy of short duration in a concentrated area programmed with a force pulse to avoid the development of detrimental heat. Such welds develop temperatures in the elements which are well below those which might cause damaging distortion or expansion. The welds may be characterized as solid state resistance welds since no perceptible fusing of the metals occurs. A precisely defined and, when desired, an extremely slight relative displacement of the parts is experienced in this type of weld so that the parts can be made to be close fitting by control of the opposed elements bonded by the weld.

The present method and article relate to joint structures and more particularly to structures including welded joints between two elements, one of which extends through an aperture in a third element of a fragile and/or heat distortable nature.

In the case of a hinge or handle secured to a light of glass, two elements of the structure are assembled on the glass by passing one element, such as the shank of a headed rod, through an aperture in the glass. The other element, a mounting plate, is positioned in abutting relation to the end of the rod opposite the head so that the glass is engaged between the head and the mounting plate. A pair of platens can be employed to hold the elements in place and to force them into contact with each other. With the platens connected to an electrical pulse weld system and the elements being made of electrically conductive material, a weld is formed between the abutting portions by applying an electrical energy pulse to the joint structure of a current density within the range of from 500,000 to 3,000,000 amperes per square inch of faying interface for an interval of the order of a millisecond time programmed with a force pulse normal to the faying interface to bond the elements without excessively stressing and distorting the adjacent material. The resultant assembly is an integral bonded structure permanently attached to the material. The electrical pulse can be complimented by a force pulse synchronized with the electrical pulse and superimposed over the force applied initially by the platens to urge the elements into intimate contact.

An example of an article produced as described above would be a headed stainless steel rod passing through an aperatrue of an automobile vent window and bonded to a stainless steel hinge mounting plate to secure the window between the rod head and mounting plate and provide a means of supporting the window on an automobile.

The joint structure is readily adaptable to spacers or bushings of an insulating or elastomer type for insertion between the joint structure and the material to which it is affixed. The method of attachment is especially useful where the spacer is of a fragile and/or heat distortable nature also.

The method and article produced thereby result in a joint structure which can be attached to fragile and/or heat distortable materials without causing thermal damage by melting or distortion and without imposing forces on the material which would cause crimping or localized stressing of the material of a detrimental nature.

BRIEF DESCRIPTION OF THE DRAWINGS

FIG. 4 is another sectioned view of a modification of the structure of FIG. 1 with the welding apparatus shown schematically, illustrating a threaded fastener structure and the means of securing it to an apertured body of fragile material;

FIG. 5 is a sectioned view of a portion of the structure of FIG. 4 illustrating an alternate form of the attaching means;

FIG. 6 is a further modification of the structure of FIG. 1 illustrating in section the use of the structure for joining overlapping elements;

FIG. 7 is an elevational view of an embodiment of a plurality of joint structures forming the frame of the open end of a bag having thermally sensitive walls;

FIG. 8 is a sectional view of the article of FIG. 7 taken along line 8—8 thereof;

FIG. 9 is an enlarged fragmentary view of a cross-section of the assembly of FIG. 7 illustrating greater detail; and FIG. 10 is a further enlarged fragmentary view of a cross-section of a single weld of FIG. 7.

DESCRIPTION OF THE PREFERRED EMBODIMENT

Figure 1:
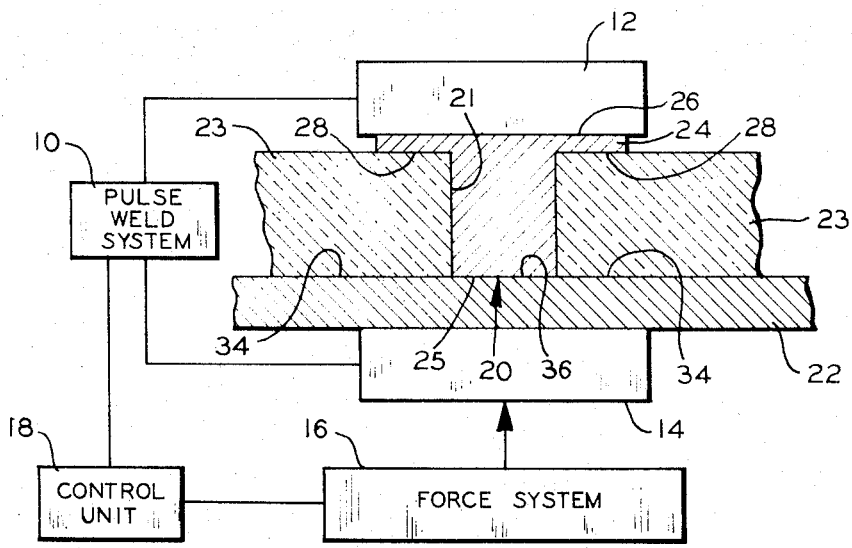
FIG. 1 is a sectioned fragmentary view of a joint structure in accordance with the present invention with welding apparatus shown schematically.

Precise control of the relative displacement of parts and the avoidance of appreciable temperature increases in the weld vicinity is achieved by precise control of the force and electrical energy imposed on the parts to be welded at magnitudes of force, current, pulse width, and pulse spacing which produce solid state resistance welds. Such welds are characterized by virtually no perceptible fusion at the faying interface, no nugget in the weld region, minor transformations, usually of grain growth in the weld region, minimal plastic deformation of a predictable and reproducible nature in the weld region and at most very slight expulsion at the faying interface margins.

Solid state resistance welds can be made with pulse techniques over a range of current densities, pressure and programming which are interrelated for any given combination of weldable materials and will vary as to the range limits with materials to be welded. In the case of a given combination various trade offs of parameters are available. A preponderance of the electrical resistance in the parts should occur at the faying faces so that the energy dissipation and fields developed (if fields are significant) are concentrated in that region. That resistance is an inverse function of the force imposed and pressures over the faying faces. Thus as the force level is reduced, the current density can be reduced to achieve a given weld. The electrical circuits for the application of electrical energy have substantial inductive reactance, hence a direct $I^2R$ relationship does not exist for this consideration. However, the range in which this variable is available as a control is for a reduction in current of about 15 percent of the maximum current required for a given weld for maximum pressure conditions.

Another force consideration is the available follow-up in the force system. Since most welds of the type under consideration are initiated with projections on at least one part to define restricted areas of initial contact and since those projections become sufficiently plastic to permit plastic flow it is found that the force tends to be reduced as the weld progresses and the contact area is enlarged. The mechanisms and parameters involved in the solid state resistance welds therefore are poorly defined during the weld formation since the area of weld may change from a point or line contact of indeterminant area (the amount of indentation into the opposed part is not known, for example). In the discussion of parameters, areas are defined as the ultimate area of a finished weld and current densities and pressures are based upon peak currents and peak force and the ultimate weld area.

Follow-up of the force system can be achieved in several ways. Where a preload and a force pulse are employed, for weld areas of the order of a 0.1 square inches, a preload of up to 3,500 pounds has been employed to advantage and a superposed force pulse of up to 20,000 pounds can be applied provided the material and structure of the part subjected to such forces can tolerate them and the contact resistance at those force levels is adequate to afford a solid-state resistance weld. The follow-up of the system takes effect as plastic flow occurs in the projection of the weld. It has been found desirable to sustain a substantial force throughout that flow. Since it occurs in the order of a millisecond or less, low inertia systems are desirable. One suitable force mechanism is disclosed in A. G. Vang U.S. Pat. No. 3,059,094 of Oct. 16, 1962 entitled "pressure Transformer". Such a mechanism can be programmed with precision to a desired force pulse form, magnitude and time relationship. One wave form is generally that of a half sine wave of from about 5 to 20 milliseconds duration. The magnitude of the peak force for a given system is a function of the duration of the electrical impulse applied to develop the force pulse. The force growth stops upon termination of current flow at the shorter intervals up to about 15 milliseconds total. For longer force pulse intervals, the peak force tends to reach and maintain a plateau value. When synchronized with a current pulse which renders the weld region plastic, this force peak may drop as flow is initiated and may repeak as the mechanical follow-up occurs. If such followup is sufficiently rapid, a second peak may be observed with that peak even exceeding the initial peak as where the applied force is augmented by the inertia of the system.

In general, solid state resistance welds are formed with greater than twice the pressure imposed in making conventional resistance welds e.g. from 20,000 to 50,000 pounds per square inch. Further, the pressure in conventional resistance welds is static in nature while the present solid state resistance welding technique involves a preloading of the elements to be welded to impose a static pressure on their faying surfaces which is augmented by a dynamic pressure derived from the force pulse superimposed on the preloaded parts during the weld cycle.

The weld electrical impulse generally is of the form of half sine wave of from about three to six milliseconds width. For any given weld optimum parameters have been established empirically. Programming is such that welding current is turned on from 0.5 to 5 milliseconds before peak force is developed at the pressure platens. Peak values of weld current density are from 500,000 to 3,000,000 amperes per square inch (on the basis of the final weld area). Desirably, the force is at or near its peak when the weld region is in its plastic state, hence the force peak is programmed to follow the weld current peak.

The initial portion of the peaking of weld current density is believed to be critical to a solid state resistance weld. The most favorable weld forming conditions are at very high current densities believed to be much in excess of the nominal peak current densities. The nominal peak current density is the quotient of the peak current divided by final weld area and that area is much greater than the initial area of contact with projections. Thus, both conductivity of the materials and resistance at the initial contact area (before the onset of plastic flow) are important. The resistance is a function of surface condition, pressure (as discussed above), and initial area of contact. For example, a 250,000 ampere pulse of up to 6 milliseconds duration will produce a solid state resistance weld over a flat area of 0.25 square inch in stainless steel whose resistivity is 75 microohm-centimeters, it will produce a weld area of 0.15 square inch in low carbon steel whose resistivity is 15 microohm-centimeters, it will produce a weld area of 0.08 square inch for low resistivity aluminum alloys, and it will produce a weld area of 0.05 square inch for even lower resistivity copper.

Two forms of welds will be discussed for two structures involving thermally sensitive and/or fragile elements in the vicinity of the weld regions. Each involve sandwiching non-metallic elements joined by solid state resistance welds at a region essentially in the plane of the material and within or adjacent the bounding walls of an aperture passing through the material. The first weld joint structures are for glass as might be employed for a window light or cookware. The second structure is for a fabric treated with an elastomer, for example, neoprene coated nylon fabric.

Referring to FIG. 1, a welding system for applying to the faying interfaces of two weldable parts a short duration, high current density electrical pulse programmed precisely in time relation to a pressure impulse is illustrated schematically with a pulse weld system 10 connected to electrically conductive platens 12 and 14 and to a force system 16 through a control unit 18. The control unit 18 serves to activate the systems 10 and 16 to assure proper sequencing and timing of the pulses.

The platens 12 and 14 are capable of converging and diverging motion to apply sufficient force to elements such as rod 20 and mounting plate 22 to hold and preload the elements once they are properly positioned. Typically, rod 20 is passed through a close fitting aperture 21 in an automobile window light 23 and is welded to mounting plate 22 at its end 25 abutting the mounting plate. Force system 16 is electrically isolated from the platen 14, upon which the force is applied, by an electrically insulating barrier, not illustrated, between the platen 14 and the force system 16.

The rod 20 has a head 24, with a flat face 26 and flange 28. When the rod 20 is passed through an aperture 21 in a material such as glass 23 the flange 28 opposes a face 34 of mounting plate 22. The glass 23 is engaged by the flange 28 and face 34 when the rod 20 is welded to mounting plate 22 at 36. By accurate control of the length of the rod 20, the mounting plate 22 can be attached thereto to form a structure which secures the glass 23 in an immovable manner without exerting a force on the glass 23 which would cause detrimental stresses therein.

Rod 20 is joined to the mounting plate by passing electrical and force pulses through the rod 20 and mounting plate 22 from the platens 12 and 14. Thence, pulses are supplied from the pulse weld and force systems 10 and 16. The bond between the rod 20 and mounting plate 22 is formed at the interface 36.

Figure 2:
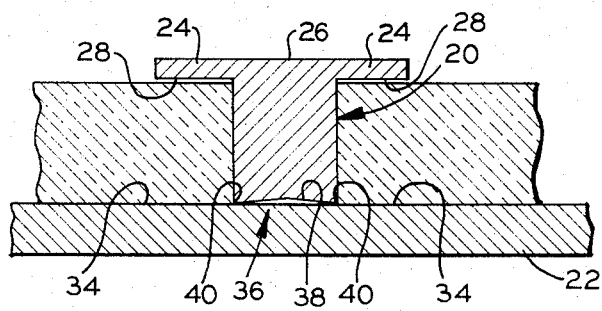
FIG. 2 is a sectioned view of a portion of the joint structure of FIG. 1 illustrating the relationship of the parts before welding.

In order to facilitate the development of the high current densities employed in solid state resistance welds, rod 20 has its end 25 recessed to define essentially a line contact between the end 25 and mounting plate 22 at the initiation of the weld. FIG. 2 illustrates a conical recess of a form having an included angle of approximately 170°. The resultant 5° deviation of the cone sides from the flat of plate 22 is in large measure eliminated by the limited plastic flow of end 25 during welding. After the bonding is completed, an annular bond of area can be observed at 40. The initial line contact and the small area of bonding cause the heat generated in the bonding process to be concentrated at the surface of face 34 of the mounting plate 22. In comparison to the land area, the rod 20 and mounting plate are very large and, therefore, act as heat sinks to rapidly dissipate the heat developed in the weld and maintain the joint structure at a temperature below that which would be detrimented to the glass 23.

It will be appreciated that where the material to which the joint structure is attached is tempered glass, the heat of ordinary welding passing from rod 20 of FIG. 1 to the walls of the aperture 25 would result in localized annealing of the tempered glass, and by the incidental expansion and contraction of the parts might create destructive stress within the glass 23. However, solid state resistance welds are formed at temperatures below those which are detrimental to such heat distortable materials.

In one application of the joint structure of the embodiment of FIG. 1, the elements are constructed of stainless steel wherein the rod 20 is of one-fourth inch diameter and, for a light of glass 0.234 inch thick, is 0.244 inch long. Its head 24 is one-half inch in diameter and 0.060 inches thick. Mounting plate 22 is 0.060 inch thick and is connected to a hinge (not shown). Attachment of the structure to glass for an automobile vent window produced an unmarred, high quality assembly which withstands the conditions imposed in automobile applications. No special cleaning is necessary prior to welding.

Weld parameters for the window light bracket include a preload of 400 pounds initialy applied by the platens 12 and 14. During the weld cycle the peak of the force pulse is 3,200 pounds. A single pulse of current of 35,000 amperes is applied over a pulse width of 2.5 milliseconds with a general half sine wave form. The magnitude of the current density before the conical undercut is subject to plastic flow has not been ascertained. Based on the final land area of the weld a current density of approximately 950,000 amperes per square inch is indicated and the initial density is much greater. Nominal shortening of the rod is 0.010 inches while the rod diameter remains the same. There is no marring of the bracket assembly made up of the hinge mounting plate 22 and the rod head 24. The bond is confined to the face 34 of the hinge mounting plate and shows no effect on the opposite face thereof. Further, no damage occurred to the glass from any heat which was generated in bonding the rod 20 to the hinge mounting plate 22. The shortening of the rod results in a tight joint between the joint structure and the window glass 23 to prevent free movement between them but is not great enough to cause destructive local stressing to the window glass 23 nor pinching or crimping of the edges or walls defining the aperture 21.

With the bonding process confined to only one side of the hinge mounting plate 22, there is no possibility of discoloration of the face of the hinge mounting plate 22 opposite the bonded face 34 should the face have a finish coating.

Examples of other materials which are sentitive to heat and of a fragile or easily damageable nature are ceramics and elastomers such as rubber. Brackets or other structures to be joined to such heat sensitive or fragile elements may be constructed of any weldable metal.

Figure 3:
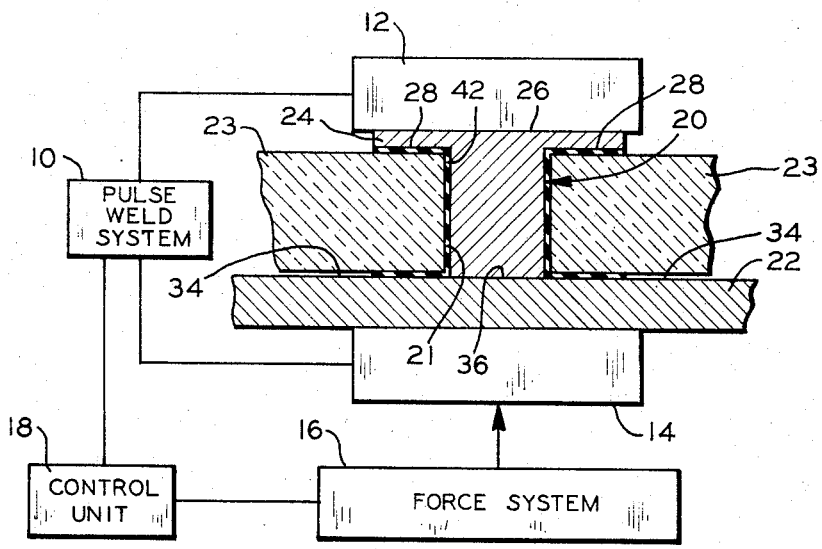
FIG. 3 is a sectioned view of a modification of the structure of FIG. 1 illustrating the incorporation of a spacer between the elments.

FIG. 3 illustrates a modification of the joint structure of FIG. 1 wherein a spacer 42 is incorporated between the rod 20 and aperture 21. The spacer 42 may be a seal which renders the joint between the joint structure and the material to which it is attached leak proof, an elastomer for providing relief for differential expansion or shock, or an insulator for heat or electricity. Depending on the use involved, the spacer 42 may be limited to the position within the aperture 21 or may, as illustrated in FIG. 3, extend to the area between the material, such as glass 23, and the flange 28 and mounting plate face 34 respectively.

The consideration of accurate control of the dimensions of the joint structure elements remain in the structure incorporating a spacer 42. The heat sensitivity of the spacer 42 also must be considered in fabricating brackets by welding and in many instances become the paramount consideration in view of the even lower temperature tolerance limit of the spacer material. The maintaining of dimensional stability is required if the spacer 42 is an elastomer to prevent prestressing of the spacer, and where the spacer is inelastic and the adjacent material is fragile, the stressing of the spacer 42 generally results in stressing of the adjacent material as well as causing detrimental stresses therein.

The bonding of the rod 20 to the mounting plate 22 using the electrical and force pulse systems 10 and 16 and welding parameters is accomplished without stressing or overheating the spacer 42 where dimensions are suitably adjusted to accommodate the spacer. Where materials or dimensions are different from those discussed, the parameters can be adjusted. In general, the higher resistivity material, such as stainless steel of 75 microohm-centimeters, is more weldable and requires lower current densities than those of lower resistivity, such as mild steel of 15 microohm-centimeters. Force of either a static, spring applied or pulsed nature is limited by the material and form of the area to which the force is applied. A range of parameters within which optimum settings for given solid state resistance welds have been empirically ascertained are a single electrical pulse of a current density of from 500,000 to 3,000,000 amperes per square inch, based on the final weld area, and of a general half sine wave form with total applied force of from about 2,000 to 20,000 pounds and pressures in the range of 20,000 tp 50,000 pounds per square inch. In these force limits it should be recognized that although even the final weld contact area is of a few hundredths of a square inch the repulsive forces of the heavy currents imposed and their short duration make precise measurement of the pressures imposed very difficult. It is theorized that the actual forces at the faying interface during the welding currents are below those applied to the system. In the detailed example of FIG. 1, the annular weld has a major diameter of 0.25 inch and a minor diameter of 0.15 inch.

A threaded fastener 44 permanently attached to a light of glass 23 with an intervening spacer 42 between the fastener 44 and the walls of an aperture 21 in the light is shown in FIG. 4. The fastener assembly 44 comprises two concentric cylinders 46 and 48 having flanges 50 and 52 embracing opposed major faces 53 and 54 of the glass 23 through the intermediate flanges 55 and 56 of spacer 42. The end 51 of cylinder 46 spaced from its flange 52 by a distance equal to the thickness of the glass 23 and the spacer flanges 55 and 56 abuts and is solid state resistance welded to the inner face of flange 50. A threaded bore 58 in cylinder 48 is adapted to receive a machine screw or like threaded fastener (not shown). Mounting brackets, hinges, or the like are conveniently secured to the glass by threaded means engaging bore 58, of threaded fastener 44.

As in the embodiments of FIGS. 1 and 3 the fastener assembly 44 of FIG. 4 is secured with a solid state resistance weld employing high pressure and a short duration, high density current pulse which minimizes the temperature rise of the parts and the weld region. For a given set of processing parameters and elements, the weld and assembly are precisely controlled and reproducible such that a shortening of the outer cylinder 46 is predictable and limited, for nominal quarter inch glass and stainless steel parts a shortening of only about 0.010 inch will be experienced where end 57 is chamfered 5° from flat and the wall area and length are of the same magnitude as for the embodiments of FIGS. 1 and 3.

Solid state resistance welds of the type shown in FIG. 4 can be produced between electrodes spaced across the thickness of glass 23 and the length of bushing 42 by mounting the lower face of flange 50 on one platen-electrode corresponding to platen-electrodes 14 of FIGS. 1 and 3 and engaging the outer face of the flange 52 with a platen-electrode corresponding to electrode 12 of FIGS. 1 and 3. In such an arrangement, the upper electrode must be electrically isolated from the end 59 of cylinder 48 to avoid short circuiting the faying surfaces between flange 50 and end 57 which are to be welded. Alternatively, the fastener 44 can be welded from a single face employing the arrangement illustrated in FIG. 4. This is accomplished by employing coaxial electrodes including an inner electrode 61 coextensive and aligned with the end 59 of cylinder 48 and spaced by an insulator 62 from a cylindrical platen-electrode 63 which is coextensive and aligned with flange 52 and is mounted to impose a force reaction to force imposed by platen 14. Platen 14 is not a part of the weld current path. The electrical welding pulse is applied across electrodes 61 and 63 from a current transformer in the pulse weld system 10. As disclosed above, the force is programmed with the weld through control unit 18 and force system 16.

The joint structure incorporating the fastener assembly 44 is versatile in that it provides a tight bond between the material and the joint s structure while allowing means for detachment in the threaded fastener. FIG. 5 illustrates an alternative fastener assembly 64 using external threads 66. One skilled in the art will realize there are numerous variations of not only threaded fasteners but other fasteners as well, for example, collets and snaps.

The joint structure may also be used to join a plurality of elements of a fragile or heat sensitive nature together as illustrated in FIG. 6. Two overlapping plates of heat distortable glass 68 and 70 with an aperture 71 extended therethrough are joinable by the rod 72 bonded to plate 73 in the manner disclosed above for the embodiment of FIG. 1. A spacer 74 can be included as discussed above and the various brackets and assemblies disclosed can be adapted to overlapped elements.

The joint structure functions in the same manner as the structure of FIG. 1 engaging the glass plates 68 and 70 between flange 75 of rod 72 and face 76 of plate 73. Location of the spacer 74 may be limited to the aperture 71 or extended, as illustrated, to the area between the glass plates 68 and 70 and face 76 and flange 75 respectively.

As in the previous embodiments, the bonding process for the joint structure elements neither overheats the materials being joined or the spacer 74 nor exerts forces on the same which would cause stresses therein.

Another application of solid state resistance welding through apertures in heat sensitive materials is the assembly of metallic frames on the mouths of bags formed of an elastomer coated fabric in the fabrication of auto safety air bags. Such a structure is illustrated in FIGS. 7 through 10. In practice, two mouths are provided spaced across the width of a bag with a bag wall across the end portion between the mouths. For the present disclosure only one mouth with its frame will be disclosed and discussed.

One side of a bag 81 with its mouth 82 and frame assembly 83 is shown in FIG. 7. Bag 81 may be of a flexible and relatively gas impervious material and has been fabricated of nylon cloth 84 having an elastomer film 85 backing as best seen in FIGS. 9 and 10. Frame assembly 83 is of sandwich construction and comprises a pair of metal frames 86 and 87 welded together at spaced locations by protuberances 88 in the frame 87 extending through apertures 89 in the sheet material of the bag 81 secured between the frames. One embodiment utilized a 0.060 inch thick front frame 86 and a 0.090 inch thick back frame 87 each of cold rolled low carbon steel which had been iron phosphated. The protuberances 88 were formed in frame 87 by a punch and die to be about 0.045 inch high, 0.250 inch diameter at their bases and domed at their tops. In plan view the frames were about 2.25 inch wide and 5.75 inch long with a window about 1.25 inch by 4.75 inch centered therein. Four projections 88 were spaced equally along each of the long sides of the frame 87 to provide weld areas 91 of about 0.05 square inch area and about 600 pounds peel strength each when solid state resistance welded to the frame 86.

In assembling typical frame assemblies 83 the sheet material having a nominal total thickness of nylin 84 and coating 85 of 0.0135 inch, is folded back upon itself to form a double thick lip region 92. Apertures 89 are formed on lip region 92 to register with and accommodate the domed protuberances 88, round apertures of 0.375 inch diameter are suitable where the protuberances have round bases of 0.25 inch diameter. As initially assebmled the frames 86 and 87 are spaced the height of the protuberances 88, 0.045 inch. In the completed assembly they are spaced 0.025 inch thereby compressing the double layer of sheet material with a mechanically gripping engagement.

Temperatures attained in the sheet material adjacent the welds during welding cannot be of a value which would be detrimental to the sheet material. The shortening of the protuberances 88 must be uniform and consistent to insure good gripping engagement by the cooperating inner faces of frames 86 and 87. Solid state resistance welds having these attributes have been made by applying a 200,000 ampere pulse for 4 milliseconds to one side of the frame assembly so that four welds of a total area of about 0.2 square inch are formed simultaneously. It will be noted that the resistivity of the metallic frame material is about 15 microohm-centimeters and is high enough so that no significant shunting of the applied current is experienced through the relatively remote opposite side of the frame. As a consequence, it can be considered that the individual welds, based on their final weld area of approximately 0.05 square inch are subjected to a current density of 1,000,000 amperes per square inch at the peak of the essentially half sine wave form of the pulse.

Force and pressure parameters for the welding of protuberances 88 are applied as a preload of about 3,000 pounds distributed over the side of the assembly 83 being welded with a force pulse peak to about 7,000 pounds so that an additional 4,000 pounds of force is superimposed on the preload by the dynamic force system. This imposes a peak pressure of about 35,000 pounds per square inch based on the final weld area. Weld control is afforded in this process by the programmed relationship of the weld current and force. The force pulse employed is of about 18 milliseconds duration with a relatively flat form in the peak region over an interval of 3 to 4 milliseconds when no weld current is imposed. The controller is programmed to peak the weld current 3 or 4 milliseconds in advance of the force peak so that the current is about zero as the force pulse peaks. As the force peak is approached, the weld face of the weld regions of plate 86 and domed portions of protuberances 88 become plastic. Accordingly, a dip in force and pressure is experienced as the surface regions flow. Thereafter as the weld formation proceeds, during the period of the force curve plateau observed when the force pulse is produced along, a resurgence of force is developed which due to the inertia of the parts and equipment causes a second peak in force at a higher level. The force pulse then declines.

The concept of welded assemblies wherein the welds are solid state resistance welds in close proximity to thermally sensitive and/or fragile elements lends itself to many variations. While each of the embodiments illustrated involved a weld of elements forming abuttments which grippingly engage the thermally sensitive element in proximity to the weld, the solid state resistance weld technique can also be made between welded elements adapted for movement relative to thermally sensitive element. One example of such a movable joint might be a rotatable shaft journaled in a close fitting aperture in a glass body and requiring that a weld joint be made in close proximity to the glass. Other utilizations include the mounting of a rubber bushing mounted on an element to be solid state resistance welded to a massive element adjacent the face of the busing without causing thermal deterioration of the rubber. Precise control of shortening of parts can also be achieved by this method to control the stresses imposed on associated elements of many forms. Accordingly, it is to be understood that the present disclosure set forth in detail above is intended to be read as illustrative and not as restricting the spirit or scope of this invention.

I claim:

1. A method of assembling a heat sensitive element and a weldable element comprising the steps of:
    forming a first and a second electrically conductive element of weldable materials with each having a weld face portion adapted to engage and be welded to the other and each, when their weld faces are engaged, having a portion spaced from the other and adapted to securingly engage the heat sensitive element;
    positioning the first electrically conductive element of weldable material in an aperture in an element of a heat sensitive nature with the weld face portion thereof in close proximity to said heat sensitive element;
    positioning the second electrically conductive element with the weld face portion thereof in close proximity to said heat sensitive element;
    holding the electrically conductive elements firmly against each other with at least one of the electrically conductive element securing portions engaging said heat sensitive element;
    applying an electrical energy pulse across the first and second electrically conductive elements of a current density within the range of from 500,000 to 3,000,000 amperes per square inch of weld interface for no more than a few milliseconds to solid state resistance weld said electrically conductive elements together with said securing portions of each securingly engaging said heat sensitive element without detrimentally increasing the temperature of the element of a heat sensitive nature and without imposing destructive forces on the elements of a heat sensitive nature.

2. The method defined in claim 1 including the step of applying a force pulse across and normal to the engaged portions of the electrically conductive elements to urge the same into intimate contact.

3. The method defined in claim 1 wherein said electrical energy pulse is applied as a single pulse of no more than a few milliseconds duration.

4. The method defined in claim 1 including the step of inserting a spacer of heat sensitive resilient material between at least one of the electrically conductive elements and the element of a heat sensitive nature prior to the step of positioning said elements.

5. The method defined in claim 1 wherein said first element is passed through two elements at least one of which is of a heat sensitive nature.

6. The method according to claim 2 wherein the applied force pulse imposes a pressure of from 20,000 to 50,000 pounds per square inch normal to the weld interface.

7. The method according to claim 1 wherein the duration of the current pulse is 3 to 6 milliseconds.

8. The method according to claim 2 wherein the duration of the applied force pulse is 5 to 20 milliseconds.

9. The method according to claim 7 wherein the force pulse peaks subsequent to the peak of the current pulse.

10. The method according to claim 9 wherein the current pulse is initiated subsequent to the initiation of the force pulse.

11. An article of manufacture comprising:
    an element of a thermally sensitive nature having first and second surfaces opposite each other across the thickness of said element and an aperture extending between said first and second surfaces;
    a first element of electrically conductive metal imposing a securing force on a portion of said first surface and having a portion extending into said aperture in said element of a thermally sensitive nature;
    a second element of electrically conductive metal imposing a securing force on said second surface of said element of a thermally sensitive nature and having a portion in registry and engagement with the portion of said first element extending into said aperture; and
    a solid state pulse resistance weld bonding said engaged portions of said first element and said second element thereby affixing said first and second elements to the element of a thermally sensitive nature.

12. An article of manufacture as defined in claim 11 wherein said first element is a rod having a head for imposing a securing force on said first surface of said element of a thermally sensitive nature.

13. An article of manufacture as defined in claim 11 wherein said second element is a flat plate.

14. An article of manufacture as defined in claim 12 wherein said rod includes internal threads within the end of said rod opposite said head.

15. An article of manufacture as defined in claim 12 wherein said rod includes external threads thereon.

16. An article of manufacture as defined in claim 11 wherein said second element is a hollow cylinder having a flange thereon imposing a securing force on said second surface and having inner walls of said cylinder spaced from said first element.

17. An article of manufacture as defined in claim 11 including a spacer between said element of a thermally sensitive nature and at least one of said first and second elements.

18. An article of manufacture as defined in claim 17 wherein said spacer is constructed of fragile or heat distrotable material.

19. An article of manufacture as defined in claim 17 wherein said spacer comprises an elastomer.

20. An article of manufacture as defined in claim 11 wherein said element of a thermally sensitive nature comprises an elastomer.

21. An article of manufacture as defined in claim 11 wherein said element of a thermally sensitive nature comprises glass.

22. An article of manufacture as defined in claim 11 wherein said element of a thermally sensitive nature comprises a light of glass; wherein said first element comprises a rod extending through an aperture in said light and having a head imposing a securing force on said first surface of said light; and therein said second element comprises a flat plate imposing a securing force on said second surface of said light.

* * * * *